US006550613B2

(12) United States Patent
Amato

(10) Patent No.: US 6,550,613 B2
(45) Date of Patent: Apr. 22, 2003

(54) TACKLE BOX WITH EFFICIENT STORAGE CAPACITY

(75) Inventor: Salvatore Amato, Niagara Falls, NY (US)

(73) Assignee: Philip F. Amato, El Paso, TX (US)

( * ) Notice: Subject to any disclaimer, the term of this patent is extended or adjusted under 35 U.S.C. 154(b) by 108 days.

(21) Appl. No.: 09/854,081

(22) Filed: May 14, 2001

(65) Prior Publication Data

US 2002/0166782 A1 Nov. 14, 2002

(51) Int. Cl.[7] .............................................. B65D 85/00
(52) U.S. Cl. .................. 206/315.11; 206/806; 43/54.1; 43/57.1
(58) Field of Search ........................... 206/315.11, 526, 206/806; 43/54.1, 57.1; 211/57.1, 59.1

(56) References Cited

U.S. PATENT DOCUMENTS

| | | | |
|---|---|---|---|
| 3,395,788 A | * | 8/1968 | Gill ........................ 206/315.11 |
| 4,111,297 A | * | 9/1978 | Paulin ........................ 206/806 |
| 5,020,269 A | * | 6/1991 | Gentry et al. ................. 43/54.1 |
| 5,123,197 A | * | 6/1992 | Gentry et al. ................. 43/54.1 |
| 6,134,825 A | * | 10/2000 | Moffett et al. ......... 206/315.11 |

* cited by examiner

Primary Examiner—Luan K. Bui
(74) Attorney, Agent, or Firm—Wallace F. Neyerlin

(57) ABSTRACT

A fish tackle box that utilizes maximum efficiency of space wherein said tackle is stored in clear plastic bags that are hung with hooks on storage rods; wherein the storage rods are moveable and are inserted into a moveable supporting arm and wherein the storage rods slide into and out of a track. The tackle box preferably has six storage rods, three each in supporting arms located on the right and left side of the tackle box. The tackle box also possesses cargo space below the tackle that is being suspended in the plastic bags that are hung with hooks on the storage rod, said cargo space being capable of storing additional tackle, tools, and larger items including reels, flashlights, and thermos bottles. The storage rods have round spools thereon mounted on pivoting metal brackets which enable the rods to be rotated for the spools to be inserted into the overhead tracks. The tackle box preferred dimensions are height about 14½ inches, depth about 10¾ inches, and width about 22 inches.

11 Claims, 6 Drawing Sheets

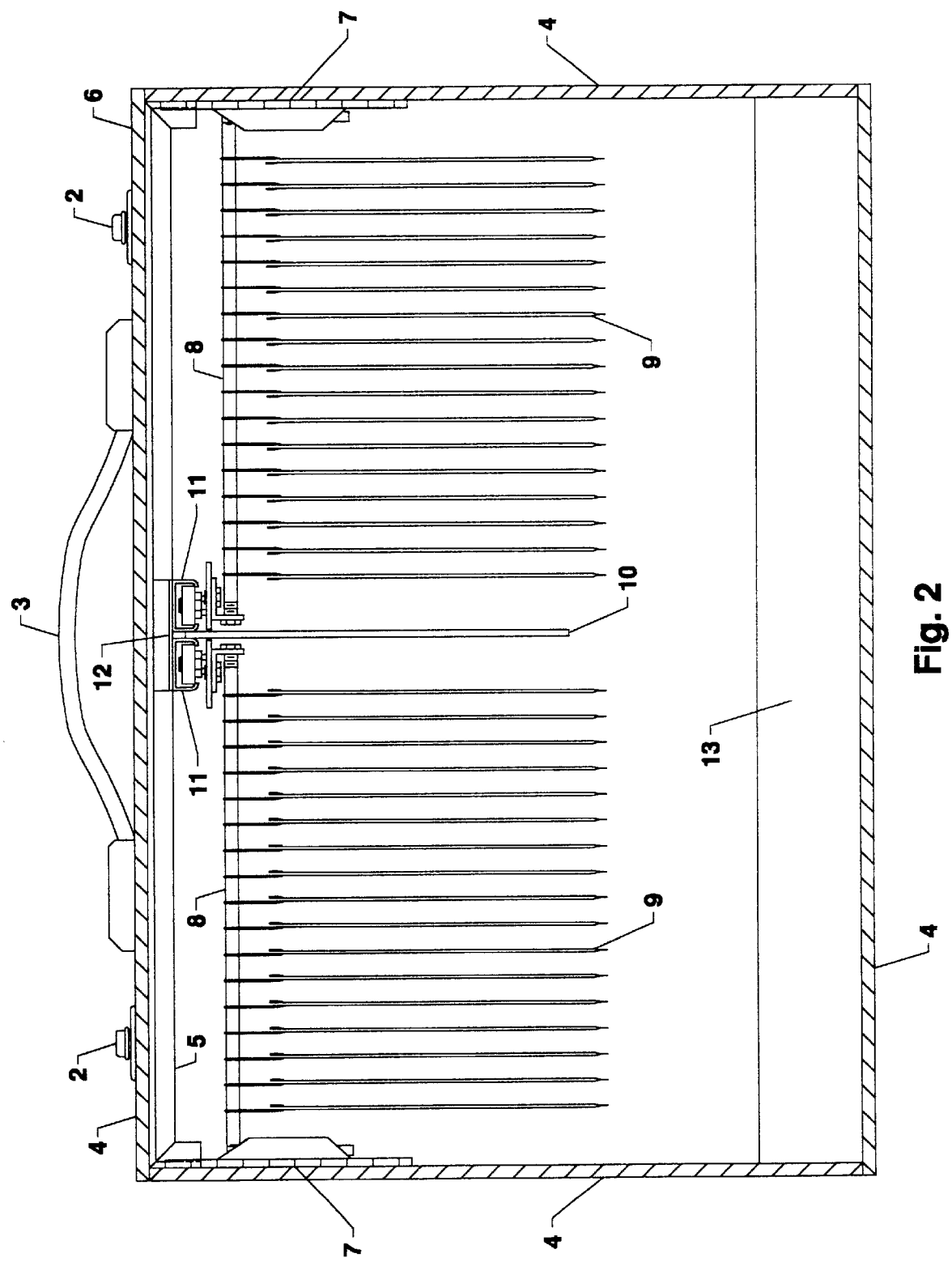

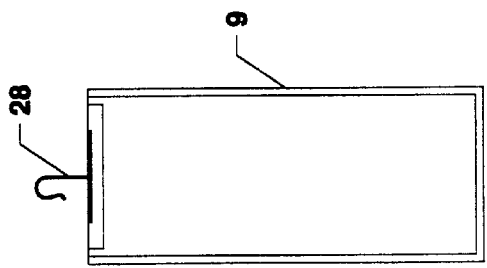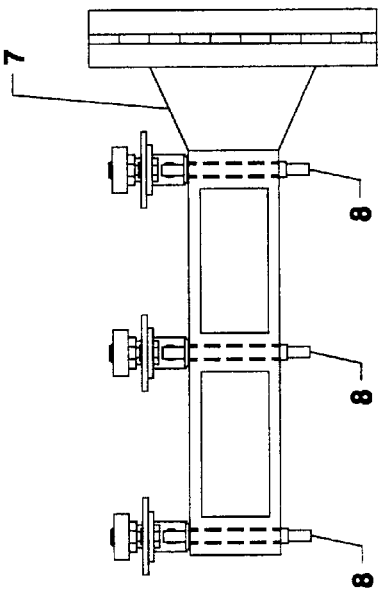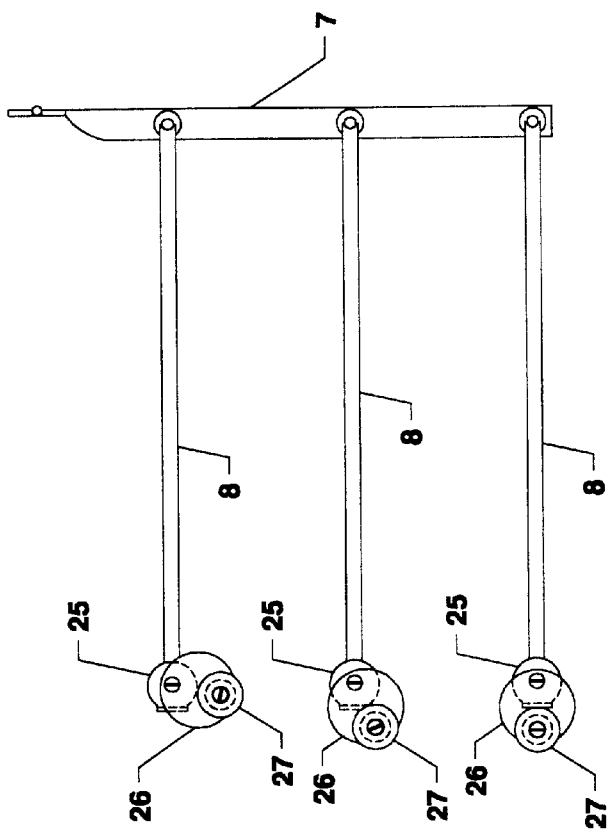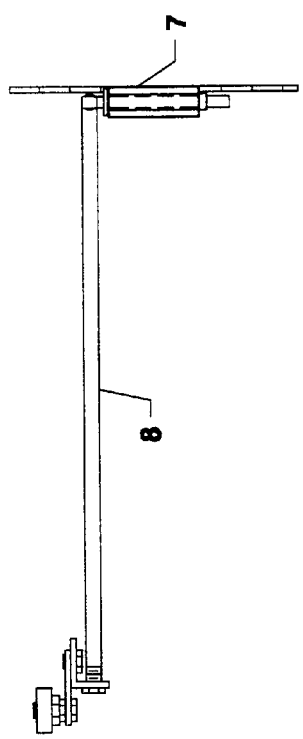

TACKLE BOX WITH EFFICIENT STORAGE CAPACITY

BACKGROUND OF THE INVENTION

1. Field of the Invention

A tackle box that utilizes maximum efficiency of spaces. The tackle box stores/holds tackle on storage rods, preferably six. All tackle is stored in clear plastic bags that are hung on the storage rods with hooks, negating the need for storage compartments or trays, shelves or partitions. The majority of the tackle is hung; however, there is sufficient cargo space below the tackle that is being suspended by the storage rods, that is capable of storing additional tackle, tools or larger items such as spools, reels, flashlights, thermos bottles or lunch.

2. Description of the Related Art

The following patents and their briefly summarized features thereof are believed of the closest relevancy to the tackle box of the present invention.

U.S. Pat. No. 5,123,197: Relating to an organizer for storing and supporting bags of fishing lures.

U.S. Pat. No. 5,606,820: Shows pivoting panels used for storing fishing lures.

U.S. Pat. No. 2,625,261: See FIG. 1 and the transparent envelopes 10.

U.S. Pat. No. 4,118,086: This is an upstanding tackle box including a plurality of storage drawers and having a horizontally pivoting closure or door 4.

U.S. Pat. No. 1,448,657: FIG. 3 best shows a slideable carrier 37 which pivots at 36 to recess the bar 35 within the case best shown in FIG. 1.

These patents show that some of the objectives of the present invention have been sought to be achieved by other inventors; and that some of the structural features of the present tackle box invention are also somewhat suggested by these prior art patents. However, it is believed that none of these patents, either taken singly or in combination, are anticipatory of the tackle box of this invention.

SUMMARY OF THE INVENTION

The tackle box of the present invention works by hanging tackle off of storage rods, preferably six, although the invention is not so limited. The tackle is stored inside of separate, clear plastic storage bags. The bags each have a hanger with a hook that snugly attaches to the storage rods. The storage rods are moveable and are inserted into a moveable supporting arm. The storage rods are supported by the supporting arms on the right and left side of the tackle box. The storage rods are also supported at the top center of the tackle box. The storage rods slide into and out of tracks that are located at the top center of the tackle box. There is one track on either side of a small clear plastic divider. Typically this plastic divider is about ⅛ inch thick, about 9¾ inches wide, about 7½ inches high and is attached at the top and to the inside rear of the box. The storage rods have rollers at the center end for easy sliding into the track and operate much the same way that a drawer slides on a track. The storage rods can be slid out of the tracks and be left outside of the tackle box. Tackle can be found quickly and easily because of the clear storage bags. The storage rods also provide easy access to tackle because one does not have to move trays or other contents to remove tackle. The box is rectangular in shape.

Preferred dimensions for a tackle box of the present invention are height about 14½ inches, depth about 10¾ inches, and width about 22 inches.

The tackle box stores the majority of the tackle and/or its contents by neatly hanging it on the storage rods. The tackle box also separates tackle, therefore, preventing it from getting tangled with spare fishing line, other lures, getting damaged or scratched by hooks, or discolored from coming in contact with other tackle or plastic/rubber worms.

This tackle box holds much more tackle than any other tackle boxes known to applicant, thus eliminating the need for more storage containers or additional tackle boxes that otherwise would be necessary.

This tackle box not only holds much more tackle; it also holds additional contents or large items. It thus eliminates the need for more than one tackle box. It also prevents the tangling of lures, hooks, snagging or damaging other contents. It also provides for easy bait access in plain view.

Typically the box will have plywood lining about ⅜ inch thick with thin metal, such as tin on the outside screwed to the plywood lining. Smaller versions of tackle boxes of this invention can be made to accommodate any fisherman. Also, other materials such as plastic can be used to construct them.

BRIEF DESCRIPTION OF THE DRAWINGS

A better understanding of the invention will be made clearer from a review of the drawings wherein:

FIG. 2 is a front sectional elevation taken through roller channel and swivel brackets used in the tackle or bait box.

FIGS. 6, 6a, and 6b are detailed views of swivel brackets and support rods of the tackle or bait box.

FIG. 7 is a view of one of the bait storage bags used in the tackle or bait box showing also one of the clips used to hold the storage bag on a support rod.

DETAILED DESCRIPTION OF THE DRAWINGS AND OF THE PREFERRED EMBODIMENTS

Figure 1A:
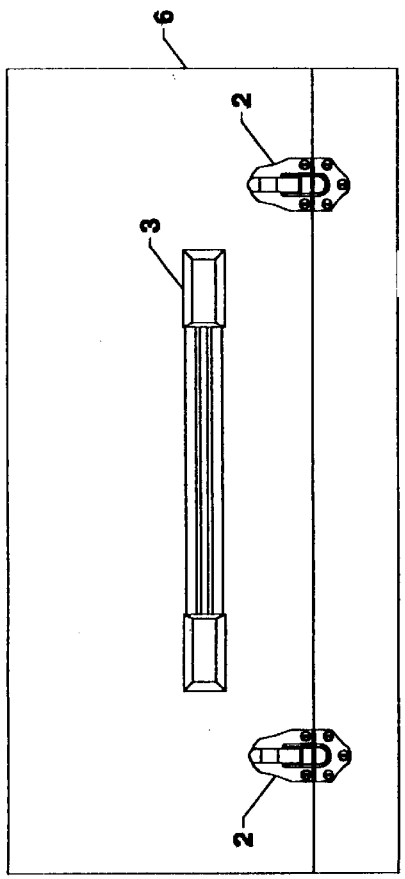
FIG. 1a is a full top view of the tackle or bait box.
Figure 1:
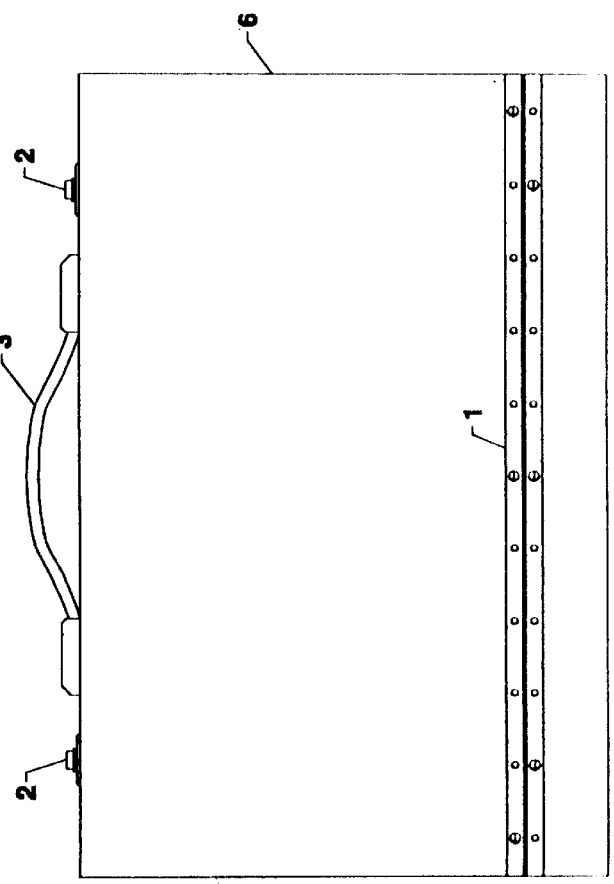
FIG. 1 is a full front view of the tackle or bait box.
Figure 1B:
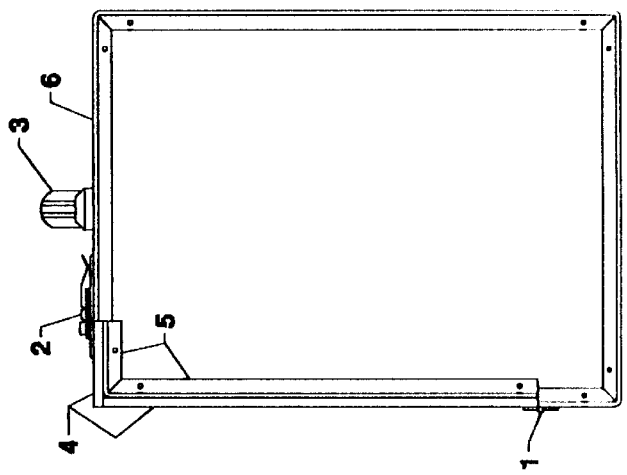
FIG. 1b is a full side view of the tackle or bait box.
Figure 5:
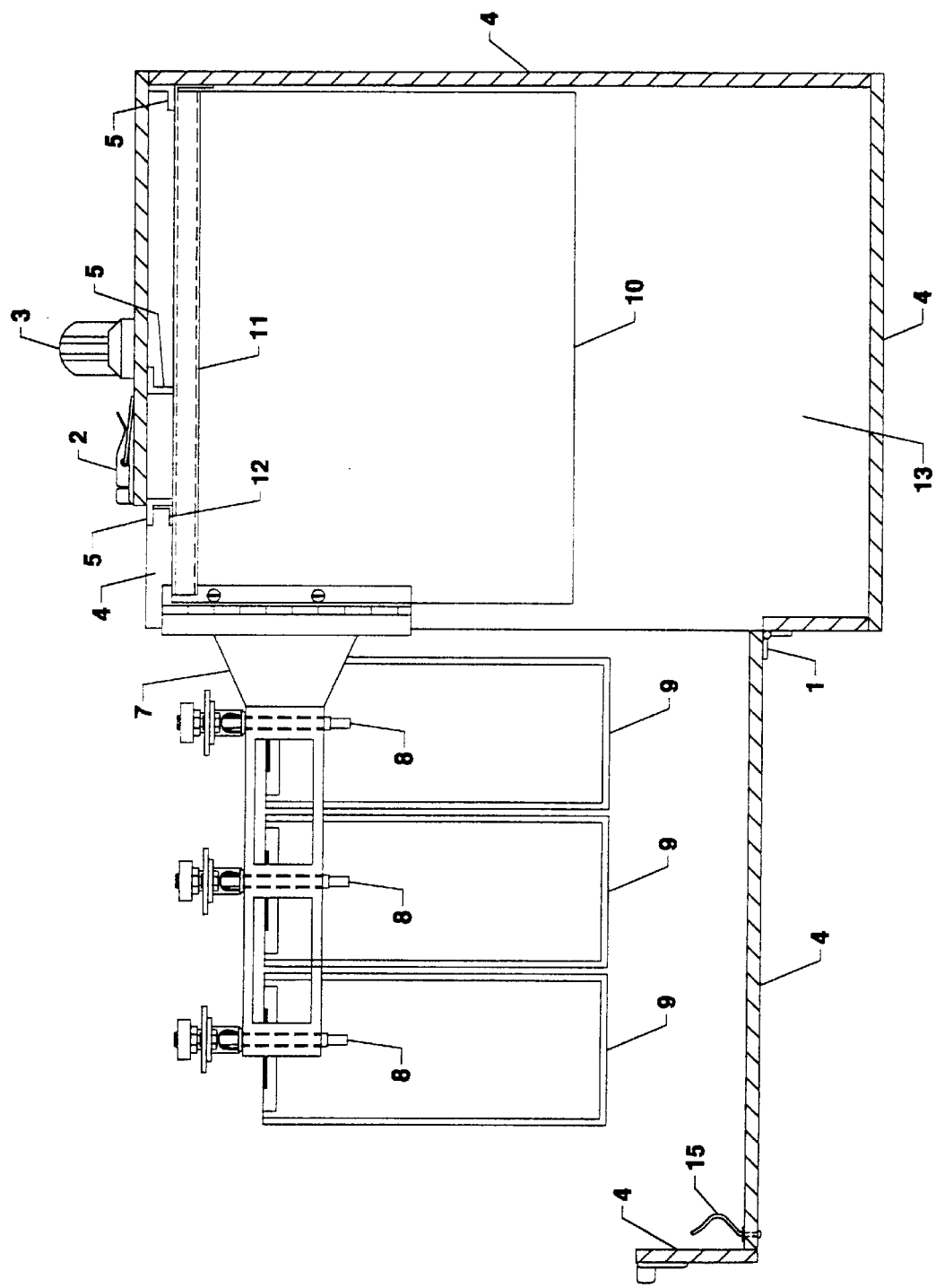
FIG. 5 is a sectional side elevation view of the tackle or bait box.

In FIGS. 1 and 1b, and 5, numeral 1 denotes a hinge for the door of the bait box. (Also shown by means of dotted lines in FIGS. 3 and 4). In FIGS. 1, 1a, 1b, 2, 3, 4, and 5, numeral 2 denotes latches used to open and tightly close the bait box. Numeral 3 in FIGS. 1, 1a, 1b, 2, 4, and 5, denotes the carrying handle for the bait box. Numerals 4 and 6 in FIGS. 1 through 5, jointly designate the wood or plywood frame and the sheet metal covering (e.g., tin) of the bait box.

FIG. 2 shows the bait box in open position. The bars holding the plastic lure bags are all in place inside the box. The prototype box is about 22 inches wide, about 14½ inches tall with a depth of about 10¾ inches. The prototype has 3 bars on the left side of the box and 3 bars on the right and the bars or rods are all in place in the two tracks at the top of the box. The spools are about ¾ inch in diameter and the inside width of the tracks is about ⅞ inch. The tracks extend to the back of the box where they are attached to the box.

In contrast to FIG. 2, FIG. 5 shows bars 8 holding plastic lure bags 9 extending out of the left inside of the box, providing ready and easy selection of the particular lure desired by the user of the tackle box. The bags are held by hooks at their tops. The hooks are tension fitted onto the cylindrical bars, but are easily detached from the bar by the person using the box. The bars are cylindrical, about ⅜ inch in diameter and the hooks are about 1 inch long. The user of the box may want to select his lure from only half of the box or from lures on only one of the rods; or from lures on all six of the rods in applicants' prototype box. FIG. 5 also shows the relatively large storage or cargo space 13 that is available at the bottom of the box under the suspended plastic lure bags 9.

Numeral 5 in FIGS. 1*b*, 2, 4, and 5, designates a multiplicity of angle supports used in the construction of the bait box. Numeral 7 in FIGS. 2, 4, 5, 6, 6*a*, and 6*b*, designate swivel brackets used to hold the support rods 8 shown in FIGS. 2, 4, 5, 6, 6*a*, and 6*b*. Storage bags used to stow the bait or lures used in the tackle box are designated by numeral 9 in FIGS. 2, 5, and 7. Numeral 10 in FIGS. 2, 4 (dotted lines), and 5, designate the two-compartment separator (e.g., clear plexiglas) used in the bait box. Numeral 11 in FIGS. 2, 4, and 5 (dotted lines), designates channel brackets for roller mechanisms attached to the tops of and at the ends of the support rods 8. (Details of these, roller "mechanisms" are described hereinafter later). Numeral 12 in FIGS. 2, 4 (dotted lines), and 5, designates an angle bracket to support the roller channel brackets as best illustrated at the top center of FIG. 2. Numeral 13 of FIGS. 2 and 5, designates a "bonus" storage area or cargo space for miscellaneous items that might be desired by the particular fisherman using the bait box (e.g., such as the previously mentioned items, spools, reels, flashlights, thermos bottles, lunch). Numeral 14 of FIG. 3 designates a tool pouch (e.g., vinyl) for being attached to the bottom of the storage area, such as by means of hooks 15 as shown in FIG. 3.

Figure 3:
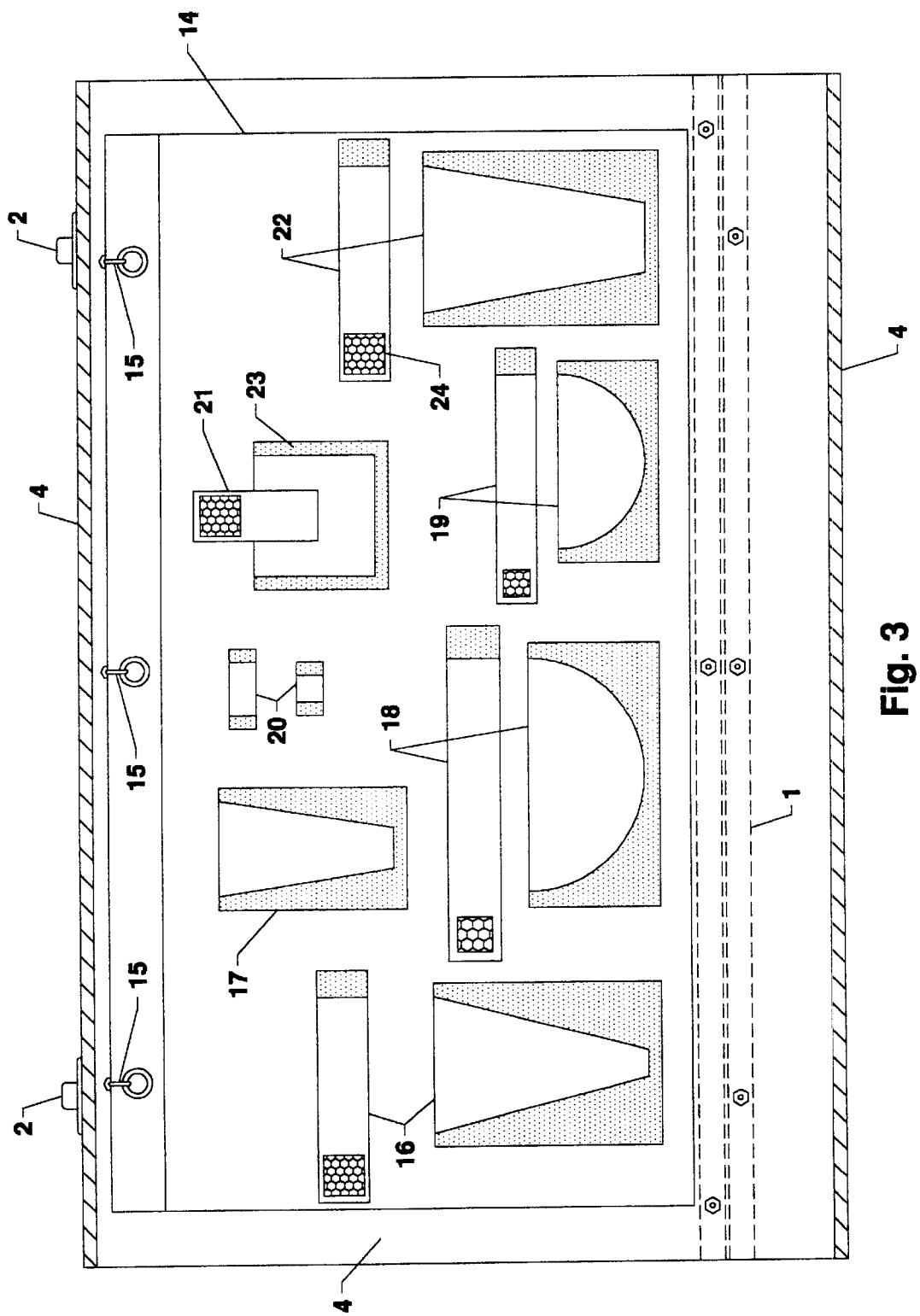
FIG. 3 is an inside elevation view of a drop down front panel of the tackle or bait box.
Figure 4:
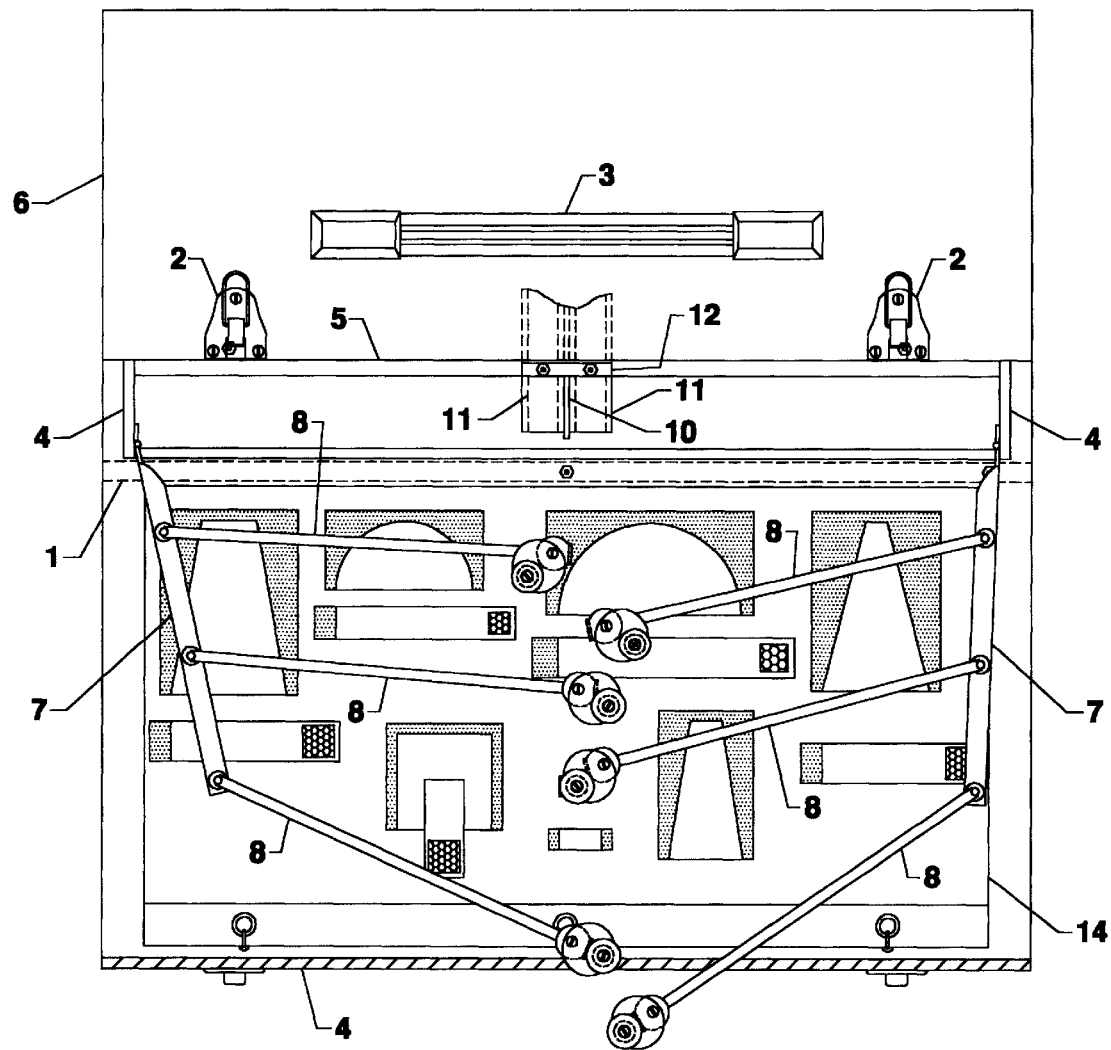
FIG. 4 is a full top view of the tackle or bait box with the front panel open.

Several "subsidiary" pouches are preferably attached or glued to the surface of main "pouch 14" as best shown in FIG. 3. The inventor of this application prefers to use storage area 16 for pliers, area 17 for a knife, area 18 for a large dipsy diver, area 19 for a small dipsy diver, area 20 for storing scissors, area 21 for a metal tape measure, area 22 for fishing snips. Dotted areas 23 of FIG. 3 designate pouch areas glued to the surface of tool pouch 14 and numeral 24 designates Velcro ends for the various pouches.

Numeral 25 in FIGS. 6, 6*a*, and 6*b*, designates an angle bracket means for attaching washer 26 to the top and to the end of support rod 8. Washer 26, in turn, serves as a means for attaching rollers 27 to the ends of the support rods by means of nuts as best shown in FIG. 6. Numeral 28 in FIG. 7 denotes storage bag hook for "tensional" attachment of a storage bag onto support rod 8.

Referring once more to FIGS. 2 and 5, the three rod holding mechanism or support arm 7 is about 5 inches long where it is attached to the inside of the bait box by means of two or three screws and is hinged at its middle (FIG. 5); rods 8 are about 9½ inches long and welded to pins which are each about 2½ inches long at the places shown in FIGS. 5 and 6*b*. All of the pins freely rotate in openings of the holding bracket or mechanism or support arm 7. The two end pins are about 6½ inches apart on the rods holding mechanism which "fans" to where it is attached to the hinged piece attached to the inner wall of the bait box as best shown in FIG. 6*b*. The other ends of the rods have the round spools thereon mounted on pivoting metal brackets which enable the rods to the rotated for the spools to be inserted into the overhead track. The spools typically are about ¾ inch in diameter and the inside width of the tracks about ⅞ inch. The tracks extend to the back of the box, where they are attached to the box.

The pins rotate in openings of the holding bracket 7. The spools or rollers 27 are attached by nut and bolt to metal discs or washers 26 which in turn are attached by nut and bolt to hinged brackets which are attached by nut and bolt to hinged brackets which are attached by nut and bolt to the ends of the support rods 8. The metal discs are loosely attached to the pivoting metal brackets 25 and freely rotate 360 degrees atop the hinged swivel bracket 7. The spools being mounted on pivoting metal brackets enable the rods to be rotated to allow the spools to be inserted in the overhead track.

Advantages over other Tackle Box Products

Some of the major advantages over other tackle boxes (storage containers) are that the tackle is stored inside of individual bags. There are never problems with lures or lines tangling and hooks catching, snaring or tangling with other tackle inside of the box. Another major advantage is that rubber or plastic worms tend to stick to or melt other tackle. Artificial worms also discolor other tackle that they come into contact with. These problems are eliminated with this tackle box. This tackle box is very organized, yet is an extremely efficient way of storing tackle that can be accessed very rapidly without making a mess or disturbing other contents that may be in the cargo area. The tackle is in plain view for display through the clear storage bags so there is no need to move other tackle that may be piled on top of something that you need. This tackle box can store more than 300 small fishing lures on the storage rods alone. However, the lower storage area can hold many more lures plus assorted items. This tackle box will hold more than double the number of lures as a similar sized tackle box, without having to place several lures into single small storage compartments, making access difficult due to lack of view, tangling, etc.

Various modifications to the above-described arrangement of the invention will become evident to those skilled in the art. The arrangement described herein is for illustrative purposes and is not to be considered restrictive.

I claim:

1. A fish tackle box that utilizes maximum efficiency of space comprising: tackle is stored in clear plastic bags that are hung with hooks on a storage rod; wherein the storage rod is moveable and is inserted into a moveable supporting arm; and wherein the storage rod slides into and out of a track; and wherein said supporting arm is attached within an interior of said tackle box.

2. A fish tackle box according to claim 1 wherein the tackle box also possesses cargo space below the tackle that is being suspended in the plastic bags that are hung with hooks on the storage rod, said cargo space being capable of storing additional tackle, tools and larger items including reels, flashlights, and thermos bottles.

3. A fish tackle box that utilizes maximum efficiency of space comprising: tackle is stored in clear plastic bags that are hung with hooks on storage rods; wherein the storage rods are moveable and are inserted into a moveable supporting arm and wherein the storage rods slide into and out of a track; and wherein said supporting arm is attached within an interior of said tackle box.

4. A fish tackle box according to claim 2 wherein the tackle box also possesses cargo space below the tackle that is being suspended in the plastic bags that are hung with hooks on the storage rod, said cargo space being capable of storing additional tackle, tools and larger items including reels, flashlights, and thermos bottles.

5. A fish tackle box according to claim 2 wherein the storage rods have round spools thereon mounted on pivoting metal brackets which enable the rods to be rotated for the spools to be inserted into the overhead tracks.

6. A fish tackle box that utilizes maximum efficiency of space comprising: tackle is stored in clear plastic bags that are hung with hooks on six storage rods; wherein the storage rods are moveable and are inserted into moveable supporting arms; wherein the supporting arms are located on the right and left side of the tackle box; and wherein the storage rods are supported at the top center of the tackle box when the tackle box is not being used.

7. A fish tackle box according to claim 3 wherein the tackle box also possesses cargo space below the tackle that is being suspended in the plastic bags that are hung with hooks on the storage rod, said cargo space being capable of storing additional tackle, tools, and larger items including reels, flashlights, and thermos bottles.

8. A fish tackle box according to claim 3 wherein the storage rods have round spools thereon mounted on pivoting metal brackets which enable the rods to be rotated for the spools to be inserted into the overhead tracks.

9. A fish tackle box according to claim 3 wherein its preferred dimensions are height about 14½ inches, depth about 10¾ inches, and width about 22 inches.

10. A fish tackle box according to claim 3 wherein the right and left side of the box are separated by a divider, said divider being about ⅛ inch thick, about 9¾ inches wide, and about 7½ inches high, and said divider being attached at the top and to the inside rear of the box.

11. A fish tackle box according to claim 3 wherein the storage rods are supported at the top center of the tackle box in tracks which extend to the back of the box where they are attached to the box.

* * * * *